(12) United States Patent
Verdu Galiana

(10) Patent No.: US 8,362,423 B1
(45) Date of Patent: Jan. 29, 2013

(54) ION TRAP

(75) Inventor: Jose Luis Verdu Galiana, East Sussex (GB)

(73) Assignee: The University of Sussex, East Sussex (GB)

( * ) Notice: Subject to any disclaimer, the term of this patent is extended or adjusted under 35 U.S.C. 154(b) by 0 days.

(21) Appl. No.: 13/237,620

(22) Filed: Sep. 20, 2011

(51) Int. Cl.
*H01J 49/38* (2006.01)

(52) U.S. Cl. .................... 250/291; 250/292; 250/396 R

(58) Field of Classification Search ................. 250/291, 250/292, 290, 396 R, 396 ML
See application file for complete search history.

(56) References Cited

U.S. PATENT DOCUMENTS 7,038,200 B2 * 5/2006 Nikolaev ................ 250/291
7,368,711 B2 * 5/2008 Franzen et al. ........... 250/291

* cited by examiner

*Primary Examiner* — Kiet T Nguyen
(74) *Attorney, Agent, or Firm* — Sheridan Ross P.C.

(57) ABSTRACT

An ion trap 1 comprises a magnetic field generator 2 arranged to generate a magnetic field and an array 3 of electrodes arranged to generate an electrostatic field including a turning point in electrical potential at a location where the magnetic field is substantially homogeneous. The array of electrodes 3 is planar and parallel to the direction of the magnetic field at the location, with the result that the ion trap can be described as a coplanar waveguide Penning trap.

15 Claims, 18 Drawing Sheets

ION TRAP

FIELD OF THE DISCLOSURE

The disclosure relates to an ion trap, and to a mass spectrometer and to a quantum electrodynamic circuit incorporating the ion trap.

BACKGROUND TO THE DISCLOSURE

An ion trap is an apparatus used to confine or isolate a charged particle, such as an electron. One such apparatus is known as a Penning trap. A Penning trap uses a magnetic field and an electrostatic field together to trap a charged particle. The magnetic field causes the charged particle to perform a rotational movement with the direction of the magnetic field being the axis of the rotation. This effectively confines the charged particle to a plane normal to the direction of the magnetic field. The electrostatic field is arranged to confine the charged particle at a location along the direction of the magnetic field, by providing a potential well for the particle at the desired location.

In order for a Penning trap to confine a charged particle effectively and to be useful for performing measurements on the trapped particle, it is important both for the magnetic field to be homogeneous and for the electrostatic field to be harmonic at the location the charged particle is to be trapped. This places constraints in the design of a conventional Penning trap and its variants, generally making them complex and expensive.

SUMMARY OF THE DISCLOSURE

According to a first aspect of the disclosure, there is provided an ion trap comprising:

a magnetic field generator arranged to generate a magnetic field; and an array of electrodes arranged to generate an electrostatic field including a turning point in electrical potential at a location where the magnetic field is substantially homogeneous, wherein the array of electrodes is planar and parallel to the direction of the magnetic field at the location.

By arranging the array of electrodes to be planar, the electrodes can be fabricated much more easily than in a conventional Penning trap, in which the electrodes are typically arranged as cylinders or hyperboloids of revolution. Furthermore, by arranging the array of electrodes parallel to the direction of the magnetic field, desired variation in the electrical potential along the direction of the magnetic field can be provided straightforwardly and reliably. In particular, the turning point at the location can be well defined. The combination of a well defined turning point and a homogeneous magnetic field at the location can make the ion trap useful for trapping ions. Indeed, it will be appreciated that, in use, ions can be trapped at the location.

It is possible for the electrodes of the array to be at different heights within the array or to have contoured surfaces. However, it is preferred that the electrodes of the array each have surfaces facing the location where the magnetic field is substantially homogeneous and that these surfaces are substantially coplanar.

The array of electrodes may comprise a row of three or more electrodes, which row is arranged to be parallel to the direction of the magnetic field at the location where the magnetic field is substantially homogeneous. Typically, the row comprises five electrodes.

Usually, the lengths of the electrodes along the direction of the row are such that an electrode in the middle of the row is shortest and electodes at the ends of the row are longest. This facilitates the lines of equipotential in the electric field to be hyperbolic along the length of the row above an electrode in the middle of the row.

The electrode array may comprise a guard electrode on each side of the row. Typically, the guard electrodes are coupled to ground, but it is also possible for an electric potential to be applied to the guard electrodes. The guard electrodes can help to ensure that the electric field has a well defined turning point above the electrode in the middle of the row in a direction across the width of the row. Moreover, the guard electrodes can help to shape the electric field such the an ion finds an equilibrium position in the electric filed at a non-zero height above the electrode in the middle of the row.

The guard electrodes can overlap the electrodes of the row. This can reduce the effect of gaps between the electrodes on the shape of the electric field, as insulation between the electrodes can be provided primarily normal to the plane of the electrode array.

Helpfully, the array of electrodes may be provided on a substrate and the magnetic field generator may be provided on the same substrate. Indeed, according to a second aspect of the disclosure there is provided an ion trap comprising:

a substrate;

a magnetic field generator provided on the substrate and arranged to generate a magnetic field; and an array of electrodes provided on the same substrate and arranged to generate an electrostatic field including a turning point in electrical potential at a location where the magnetic field is substantially homogeneous, wherein the array of electrodes is planar and parallel to the direction of the magnetic field at the location.

This significantly simplifies fabrication of the ion trap, by allowing the magnetic field generator to be provided close to the electrode array. This can help to eliminate the need for expensive superconducting coils to generate a sufficiently strong magnetic field from a remote location, as in conventional Penning traps, as the magnetic field close to the magnetic field generator can be utilised. It can also mean that the ion trap can be manufactured as a small scale integrated electronic device, for example using thin or thick film fabrication techniques.

The magnetic field generator may comprise a row of magnetic elements, which row extends in the same direction as the row of electrodes. This can help to ensure that the magnetic field is sufficiently homogeneous at the desired location, as the different magnetic elements in the row can compensate for one another.

In one example, the magnetic elements each comprise a wire arranged to conduct an electric current. Wires made of conducting material can be sufficient for many applications, but the wires may alternatively be superconducting wires. In another example, the magnetic elements each comprise a permanent magnet. Again, the permanent magnets may be high temperature superconductors.

A primary magnetic element may arranged to generate a first component of the magnetic field and the other magnetic elements may be arranged to generate compensating components of the magnetic field that reduce the gradient and curvature of the first component of the magnetic field at the location where the magnetic field is substantially homogeneous. The compensating components of the magnetic field can be selected by choosing appropriate dimensions for the magnetic elements and, where the magnetic elements are wires, choosing appropriate electric currents in the wires or, where the magnetic elements are permanent magnets, choosing the strength of the magnets appropriately.

The electrode array may be provided on a top surface of the substrate and the magnetic field generator may be provided below the electrode array.

The ion trap has a number of useful applications. In particular, there is provided a mass spectrometer comprising the ion trap. There is also provided a quantum electrodynamic circuit comprising the ion trap. In the context of an electrodynamic circuit, the ion trap may be arranged to store information based on spin of an electron captured in the trap or based on cyclotron motion of an electron captured in the trap. Alternatively, the ion trap may find application as a quantum processor or matter-wave beam-splitter.

DETAILED DESCRIPTION OF THE PREFERRED EMBODIMENTS

Figure 1:
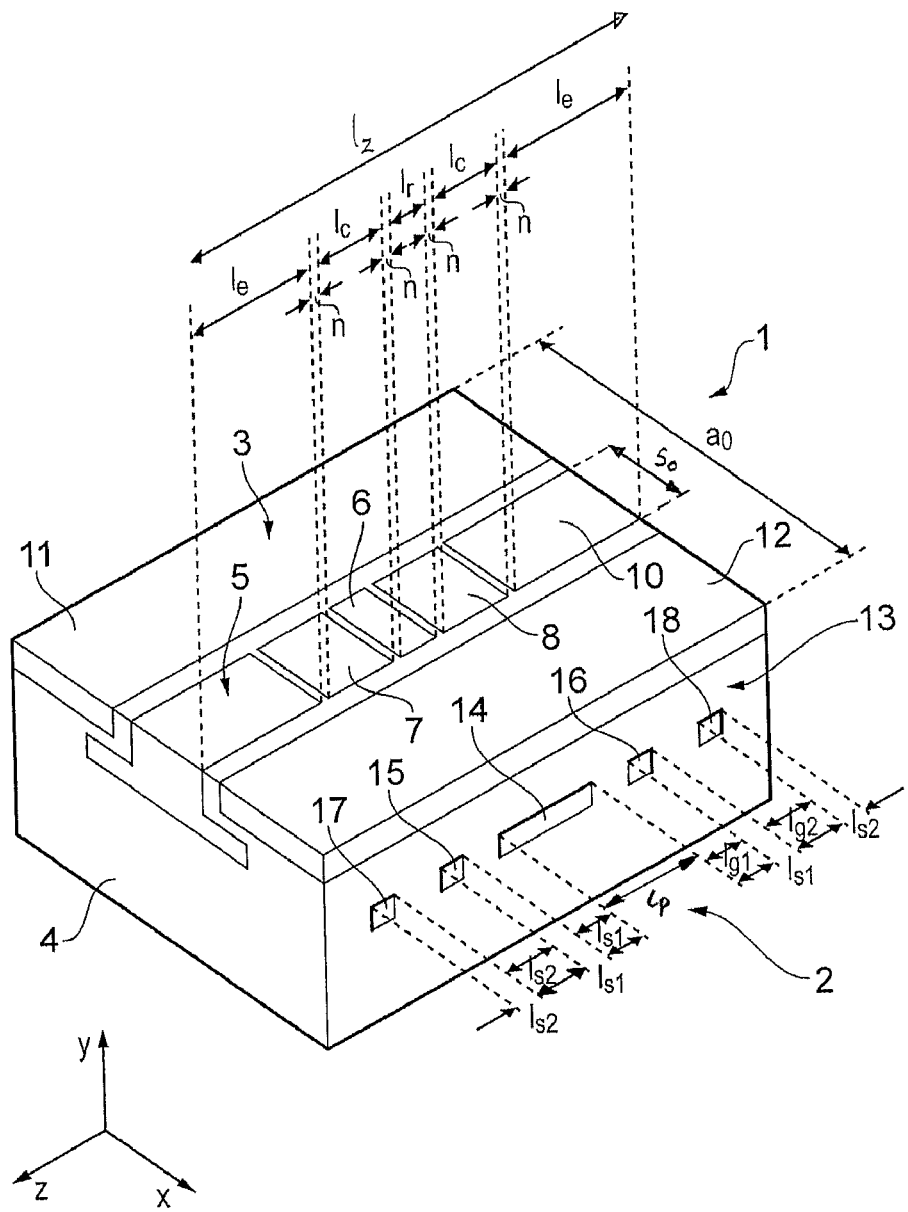
FIG. 1 is a schematic illustration of an ion trap according to a first preferred embodiment.
Figure 2:
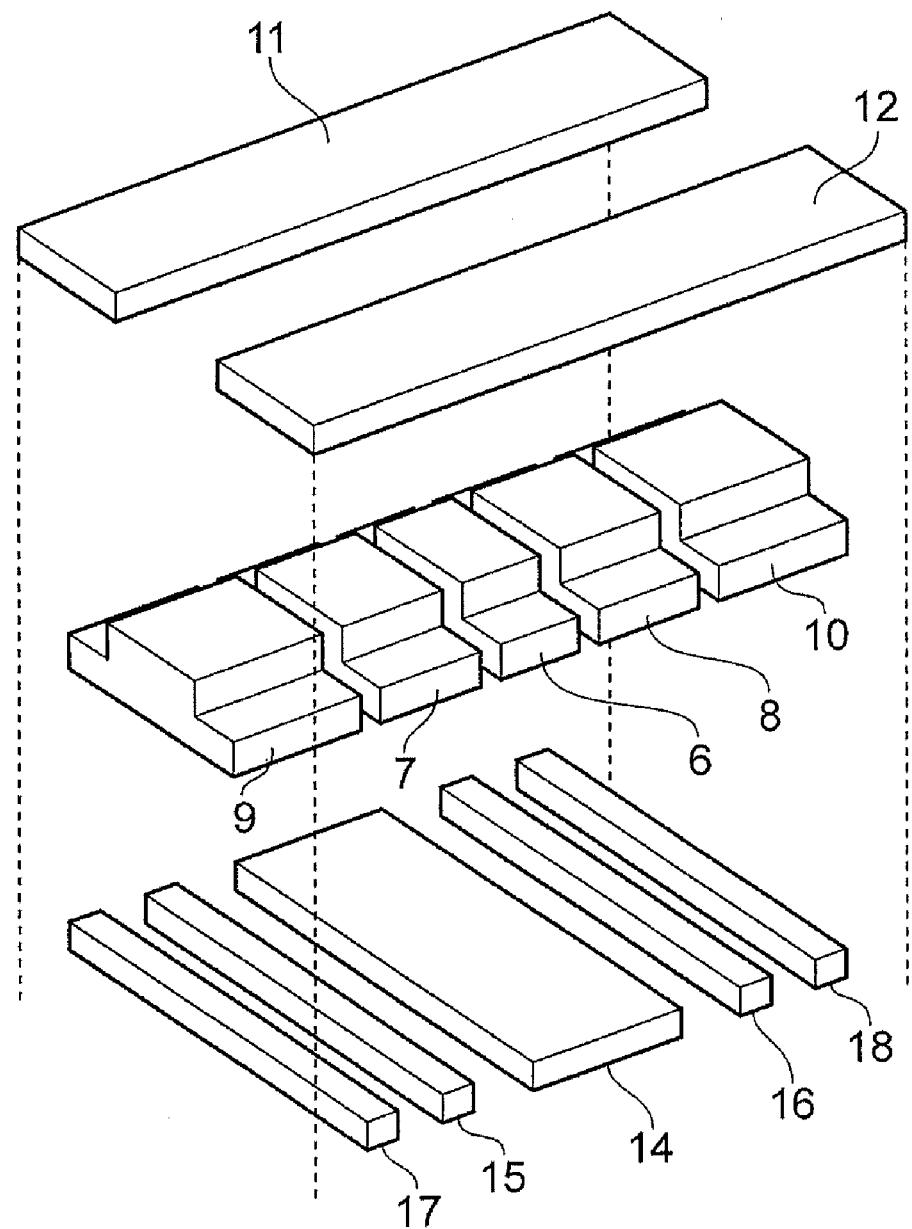
FIG. 2 is an exploded schematic illustration of the ion trap omitting a substrate.

Referring to FIGS. 1 and 2, an ion trap 1 comprises a magnetic field generator 2 and an electrode array 3 provided on a substrate 4. The ion trap 1 is effectively a variant of a conventional Penning trap, and can be referred to as a Penning trap in the context of the general principles of its operation, although not in terms of its specific structure, which differs significantly. The term "coplanar waveguide Penning trap" has been coined to describe the ion trap 1.

It should be noted that the ion trap 1 is described in the context of a trap for negatively charged ions, in particular an electron, for simplicity. However, the skilled person will recognise that the trap can equally be used for trapping positively charged ions by reversing the polarity of the electrode array 3.

In this embodiment, the substrate 4 is a dielectric material suitable for forming a microwave transmission line, for example for microwaves in the range 3 to 30 GHz. Suitable materials are, for example, sapphire or quartz.

The electrode array 3 comprises a ring electrode 6, two compensation electrodes 7, 8 and two end cap electrodes 9, 10 arranged in a row 5. The ring electrode 6 is in the middle of the row 5 and the end cap electrodes 9, 10 are at the ends of the row 5. The compensation electrodes 7, 8 are each between a respective end cap electrode 9, 10 and the ring electrode 6. In other embodiments, the compensation electrodes 9, 10 are omitted and the row 5 includes only the ring electrode 6 and end cap electrodes 9, 10. On each side of the row 5 is a guard electrode 11, 12. Wires (not shown) are provided so that electric potential can be applied to the electrodes 6, 7, 8, 9, 10, 11, 12. In this embodiment, the two compensation electrodes 7, 8 are electrically coupled to one another by the wires, the two end cap electrodes 9, 10 are electrically coupled to one another by the wires and the two guard electrodes 11, 12 are electrically coupled to one another by the wires so that respective electric potentials $V_c$, $V_e$, $V_g$ can be applied to the pairs of compensation electrodes 7, 8, end cap electrodes 9, 10 and guard electrodes 11, 12.

The electrodes 6, 7, 8, 9, 10, 11, 12 can be made of any conducting material, such as gold or copper. Alternatively, they may be superconducting. Typically a conducting material is sufficient when the ion trap 1 is used as a mass spectrometer, whereas a superconducting material is appropriate when the ion trap is used in quantum electrodynamic circuit (circuit-QED) applications.

The electrode array 3 has a length $l_z$ in the direction of the row 5 of electrodes 6, 7, 8, 9, 10 and a width $a_0$. Within the length $l_z$ of the electrode array 3, the ring electrode 6 has a length $l_r$, the compensation electrodes 7, 8 each have length $l_c$ and the end cap electrodes 9, 10 each have length $l_e$. In other words, the lengths $l_c$ of the compensation electrodes 7, 8 are the same, and the lengths $l_e$ of the end cap electrodes 9, 10 are the same. The ring electrode 6, compensation electrodes 7, 8 and end cap electrodes 9, 10 each also have the same width $S_0$. Typically, the length $l_r$ of the ring electrode 6 is greater than or equal to 0.1 mm, the length $l_c$ of the compensation electrodes 7, 8 is less than or equal to 2 mm and the length of the end cap electrodes 9, 10 is between 0.5 mm and 10 mm inclusive. The electrodes 6, 7, 8, 9, 10 in the row 5 are each spaced apart from one another by gaps. In this embodiment, the gaps all have the same length q. The electrodes 6, 7, 8, 9, 10 are arranged in the row 5 such that the row 5 is symmetrical about an imaginary line that bisects its length. In other words, the row 5 is symmetrical lengthwise about a centre line of the ring electrode 6.

The electrode array 3 is planar, in the sense that the electrodes 6, 7, 8, 9, 10, 11, 12 of the electrode array 3 are all arranged side by side facing in the same direction. In this embodiment, the electrodes 6, 7, 8, 9, 10, 11, 12 of the electrode array 3 are provided on a top surface of the substrate 4 and themselves each have top surfaces that are in the same plane. In other words, the top surfaces of the electrodes 6, 7, 8, 9, 10, 11, 12 are coplanar. However, in other embodiments, the top surfaces of the electrodes 6, 7, 8, 9, 10, 11, 12 are at different heights or are contoured, whilst the electrode array 3 still remains planar overall.

The magnetic field generator 2 comprises a row 13 of a primary magnetic element 14 and four shim magnetic elements 15, 16, 17, 18. The primary magnetic element 14 is in the middle of the row 13 and the shim magnetic elements 15, 16, 17, 18 are positioned symmetrically on each side of the primary magnetic element 14. The primary magnetic element 14 has a length $l_p$ in the direction of the row 13, the shim magnetic elements 15, 16 adjacent the primary magnetic element 14 each have length $l_{s1}$ in the direction of the row 13 and the shim magnetic elements 17, 18 at the ends of the row 13 each have length $l_{s2}$ in the direction of the row 13. The primary magnetic element 14 is spaced apart from each of the shim magnetic elements 15, 16 adjacent the primary magnetic element 14 by gaps having length $l_{g1}$ and the shim magnetic elements 15, 16 adjacent the primary magnetic element 14 are spaced apart from the shim magnetic elements 17, 18 at the ends of the row 13 by gaps having length $l_{g2}$.

In this embodiment, the magnetic elements 14, 15, 16, 17, 18 are each superconducting wires coupled so as to convey an electric current perpendicular to the length of the row 13 and parallel to the plane of the electrode array 3. In other embodiments, the magnetic elements 14, 15, 16, 17, 18 are each conducting wires, permanent magnets or high temperature superconducting permanent magnets. In any case, the magnetic elements 14, 15, 16, 17, 18 are arranged to generate a magnetic field that has a direction substantially parallel to the row 5 of electrodes 6, 7, 8, 9, 10 and that is substantially homogeneous at a location above the ring electrode 6.

Ignoring the outer edges of the electrode array 3 and instead assuming that the outer edges extend to infinity, for simplicity, the electric field generated by the electrode array 3 can be expressed as $$\phi(x,y,z) = V_r \times f_r(x,y,z) + V_c \times f_c(x,y,z) + V_e \times f_e(x,y,z) + f_{gaps}(x,y,z|V_r,V_c,V_e) \quad (1)$$

where $V_r$, $V_c$ and $V_e$ represent DC voltages applied to the ring electrode 6, the compensation electrodes 7, 8 and the end cap electrodes 9, 10 respectively. The functions $f_r$, $f_c$ and $f_e$ represent the contribution to the electrostatic field of the ring electrode 6, the compensation electrodes 7, 8 and the end cap electrodes 9, 10 respectively. These functions $f_r$, $f_c$ and $f_e$ depend only on the dimensions of the electrodes 6, 7, 8, 9, 10. The function $f_{gaps}$ represents the contribution to the electrostatic field of the gaps between the electrodes 6, 7, 8, 9, 10 and depends on both the dimensions of the gaps and the DC voltages $V_r$, $V_c$ and $V_e$ applied to the electrodes 6, 7, 8, 9, 10.

Figure 3:
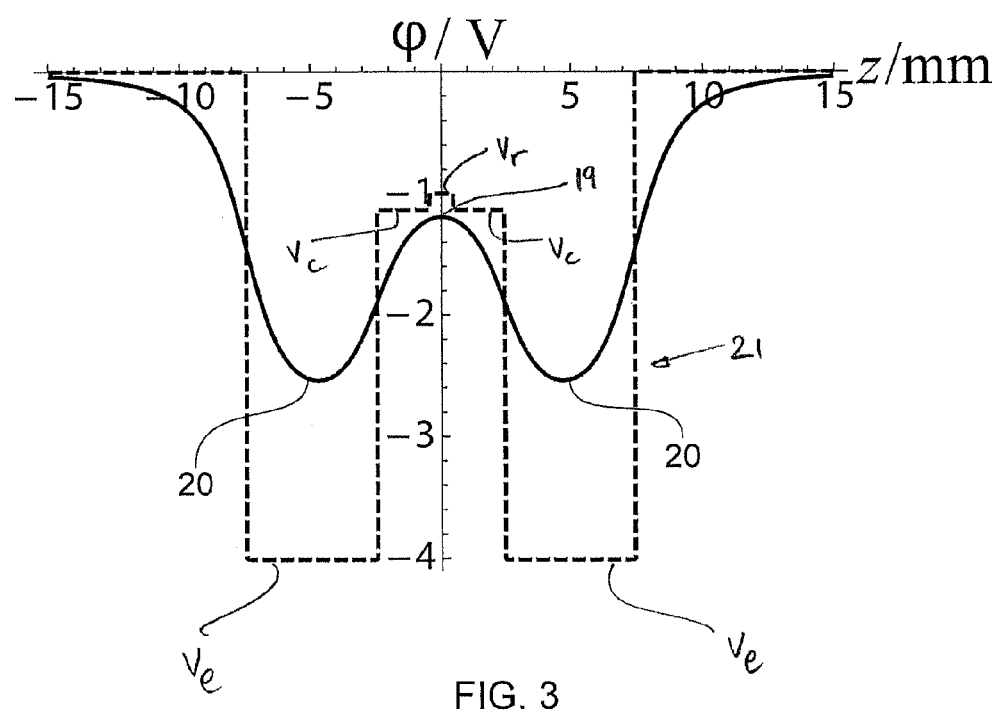
FIG. 3 is a graphical illustration of electrostatic potential along the length of a row of electrodes of the ion trap.
Figure 4:
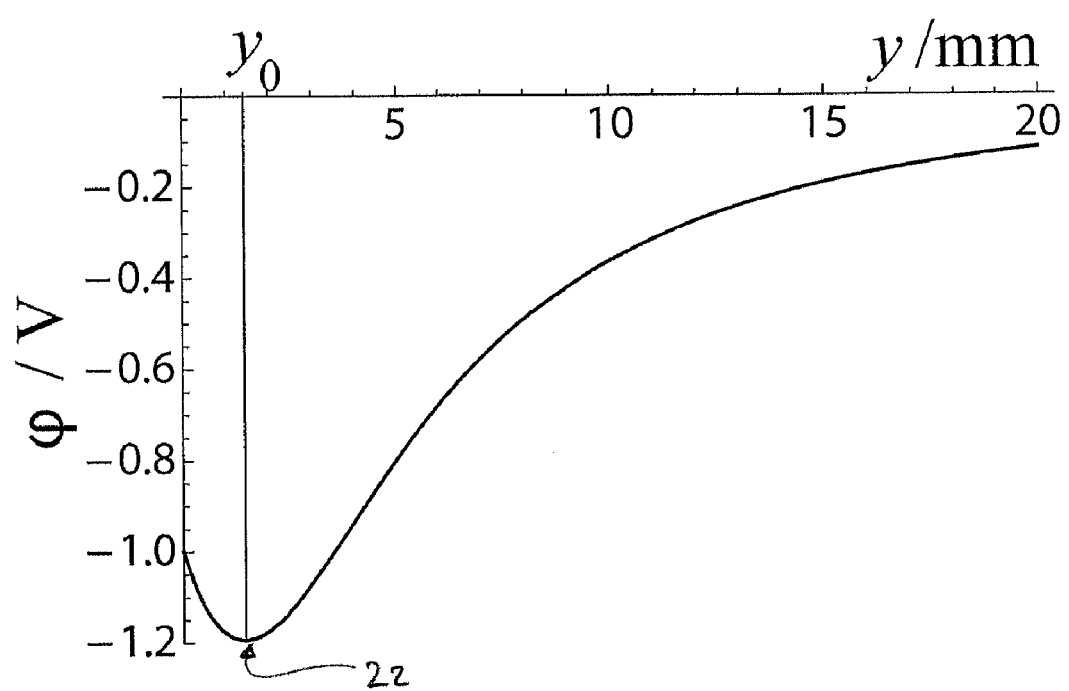
FIG. 4 is a graphical illustration of electrostatic potential with height above the centre of an electrode in the middle of the row of electrodes of the ion trap.

The basic functioning of the ion trap 1 can be illustrated by computing an example using equation (1). For this purpose, we choose $l_r=0.9$ mm, $l_c=2.0$ mm, $l_e=5.0$ mm, $\eta=0.1$ mm and $S_0=7.0$ mm and the voltages applied to the electrodes 6, 7, 8, 9, 10, 11, 12 are $V_r=-1V$, $V_c=-1.15V$, $V_e=-4V$ and $V_g=0V$. These voltages allow for capturing electrons or any negatively charged particles around a position directly above the centre of the ring electrode 6, which is defined in a Cartesian reference frame at x=0, y=$y_0$, z=0, where $y_0$ is known as the trapping height. It is noteworthy that the end cap electrodes 9, 10 are not grounded. The relationship between the voltages applied to the electrodes 6, 7, 8, 9, 10 in the row 5 can generally be defined as $$|V_e| > |V_c| \geq |V_r| \quad (2)$$

in order that the trapping height $y_0$ has a non-zero value and there is an equilibrium position at a distance $y_0>0$ above the surface of the ring electrode 6. Referring to FIG. 3, the electric field $\phi$ at the trapping height $y_0$ ($\approx 1.37$ mm in this example) above the ring electrode 6 varies in direction z along the length of the row 5 of electrodes 6, 7, 8, 9, 10, having a maxima 19 above the centre of the ring electrode 6 and mimima 20 on each side of the ring electrode 6. In FIG. 3, the dashed line 21 shows how the voltages $V_r$, $V_c$ and $V_e$ applied to the ring electrode 6, compensation electrodes 7, 8 and end cap electrodes 9, 10 vary with the direction z. The variation of the electric field $\phi$ in the direction y normal to the electrode array 3 is shown in FIG. 4. It can be seen that the electric field $\phi$ has a minima 22 above the centre of the ring electrode 6 at the trapping height $y_0$.

The trapping height $y_0$ can be determined by the equality $$\left.\frac{\partial \phi(0,y,0)}{\partial y}\right|_{y=y_0} = 0 \quad (3)$$

If the length $\eta$ of the gaps between the ring electrode 6, compensation electrodes 7, 8 and end cap electrodes 9, 10 is vanishingly small, i.e. $\eta \to 0$, then $f_{gaps} \to 0$ and, with this approximation, the equation for calculating the trapping height $y_0$ is $$\left.\frac{\partial f_r}{\partial y}\right|_{y=y_0} + T_c \cdot \left.\frac{\partial f_c}{\partial y}\right|_{y=y_0} + T_e \cdot \left.\frac{\partial f_r}{\partial y}\right|_{y=y_0} = 0 \quad (4)$$

This equation introduces a compensation tuning ratio $$T_c = \frac{V_c}{V_r}$$

and an end cap to ring tuning ratio $$T_e = \frac{V_e}{V_r}.$$

Equation 4 shows that the trapping height $y_0$ depends only the compensation tuning ratio $T_c$ and the end cap to ring tuning ratio $T_e$. This formal dependence holds also for the less restrictive case that the length $\eta$ of the gaps is just very small or sufficiently small to be discounted, $\eta \ll l_r, l_c, l_e, S_0$. Equation 4 cannot be solved analytically for $y_0$, only numerical values can be obtained.

The series expansion of $\phi(x, y, z)$ around the equilibrium position $(0, y_0, 0)$, including terms up to the $4^{th}$ order, has the following form $$\phi(x,y,z) = \phi(0, y_0, 0) + \ldots + \underbrace{C_{002}z^2 = C_{200}x^2 + C_{020}(y-y_0)^2}_{\phi_{quad}} + \quad (5)$$

$$\underbrace{C_{012}z^2(y-y_0) = C_{210}x^2(y-y_0) + C_{030}(y-y_0)^3}_{odd\ anharmonicities} +$$

$$\underbrace{C_{202}z^2x^2 + C_{022}z^2(y-y_0)^2 + C_{220}x^2(y-y_0)^2 +}_{} $$
$$\underbrace{C_{004}z^4 + C_{400}x^4 + C_{040}(y-y_0)^4}_{even\ anharmonicities}$$

The expansion coefficients are defined by $$C_{ijk} = \frac{\partial^{i+j+k} \phi(x, y, z)}{\partial x^i \partial y^j \partial z^k}\bigg|_{(0,y_0,0)} \quad (6)$$

The symmetry of the electric filed $\phi(x, y, z)$ implies that all expansion coefficients $C_{ijk}$ with odd i and/or odd k vanish. The expansion coefficients $C_{ijk}$ define to a great extent the performance of the ion trap 1. As for equation (4), if the length $\eta$ of the gaps is sufficiently small, then the expansion coefficients $C_{ijk}$ scale linearly with the voltage $V_r$ applied to the ring electrode 6, i.e. $C_{ijk} = V_r \cdot c_{ijk}$ where $c_{ijk} = c_{ijk}(T_c, T_e)$ depends only on $T_c$ and $T_e$.

Plugging the series expansion given in equation (5) into Laplace equation, $\nabla^2 \phi(x, y, z) = 0$, the following equalities can be obtained $$C_{200} + C_{020} + C_{002} = 0$$

$$3C_{030} + C_{210}C_{012} = 0$$

$$6C_{400} + C_{220} + C_{202} = 0$$

$$6C_{040} + C_{220} + C_{022} = 0$$

$$6C_{004} + C_{202} + C_{022} = 0$$

In the case of a three dimensional hyperbolic or cylindrical trap, the coordinates x and y are undistinguishable, i.e. $C_{200} = C_{020}$. Thus, the first equality in (7) reduces to $C_{200} = 2C_{020}$. From this, the electric potential of an ideal classical Penning trap arises, $\phi = C_{200}(z^2 - (x^2 + y^2)/2)$. For the ion trap described herein, x and y are distinguishable and the curvatures $C_{200}$ and $C_{020}$ are not identical, i.e. $C_{200} \neq C_{020}$. Hence the general form of the pure quadrupole potential, i.e. including terms only up to the second order, is:

$$\phi_{quad}(x, y, z) = C_{002} \cdot \left(z^2 - \frac{x^2 + (y - y_0)^2}{2}\right) + \frac{1}{2} C_{002} \varepsilon \cdot (x^2 - (y - y_0)^2) \quad (8)$$

The ellipticity parameter $\in$ is given by $$\varepsilon = \frac{C_{200} 0 C_{020}}{C_{002}}.$$

In general the ellipticity parameter $\in$ is non-zero, i.e. $\in \neq 0$, and the ion trap 1 is therefore an elliptical Penning trap.

The cyclotron frequency $\omega_p (=2\pi v_p)$, magnetron frequency $\omega_m (=2\pi v_m)$ and axial frequency $\omega_z (=2\pi v_z)$ of a particle with charge q and mass m in an ideal elliptical Penning trap are given by $$\omega_p \sqrt{\frac{1}{2}(\omega_c^2 - \omega_z^2) + \frac{1}{2}\sqrt{\omega_c^2 \omega_1^2 + \varepsilon^2 \omega_z^4}} \quad (9)$$

$$\omega_m \sqrt{\frac{1}{2}(\omega_c^2 - \omega_z^2) + \frac{1}{2}\sqrt{\omega_c^2 \omega_1^2 + \varepsilon^2 \omega_z^4}}$$

$$\omega_z \sqrt{2 C_{002} \frac{q}{m}}$$

with $$\omega_c = \frac{q}{m} \cdot B \text{ and } \omega_1 = \sqrt{\omega_c^2 - \omega_z^2},$$

where B is the strength of the magnetic field provided by the magnetic field generator 2 at the trapping height $y_0$. When the ellipticity parameter $\in$ is zero, i.e. $\in = 0$, expressions for the cyclotron frequency $\omega_p$, magnetron frequency $\omega_m$ and axial frequency $\omega_z$ of a circular Penning trap can be recovered. For the ion trap 1 described herein, the ellipticity parameter $\in$ is approximately equal to 0.41. According to equation (9), the cyclotron frequency $\omega_p$, magnetron frequency $\omega_m$ and axial frequency $\omega_z$ of a trapped electron are therefore $\omega_p = 2\pi \cdot 14$ GHz, $\omega_z = 2\pi \cdot 28$ MHz and $\omega_m = 2\pi \cdot 26$ kHz respectively, based on a magnetic field strength B approximately equal to 0.5 Tesla.

The radial motion in an ideal elliptical trap is given by $$(x(t), y(t) - y_0) = (A_p \xi_p \cos(\omega_p t) + A_m \xi_m \cos(\omega_m t), A_p \eta_p \sin(\omega_p t) + A_m \eta_m \sin(\omega_m t))$$

where the amplitudes are given by $$A_p = \frac{1}{\omega_p} \sqrt{\frac{2 E_p}{\gamma_p m}}, \gamma_p = 1 - \frac{\omega_z^2}{2\omega_p^2} \simeq 1 \text{ and}$$

$$A_m = \sqrt{\frac{2 E_m}{(\omega_m^2 - \omega_z^2/2) m'}},$$

and by $$\xi_{p,m} = \sqrt{\frac{\omega_c^2 + \varepsilon \omega_z^2 \pm \sqrt{\omega_c^2 \omega_1^2 + \varepsilon^2 \omega_z^4}}{2\omega_p/\omega_1 \sqrt{\omega_c^2 \omega_1^2 + \varepsilon^2 \omega_z^4}}} \quad (11)$$

$$\eta_{p,m} = \sqrt{\frac{\omega_c^2 + \varepsilon \omega_z^2 \pm \sqrt{\omega_c^2 \omega_1^2 + \varepsilon^2 \omega_z^4}}{2\omega_p/\omega_1 \sqrt{\omega_c^2 \omega_1^2 + \varepsilon^2 \omega_z^4}}}$$

Figure 5:
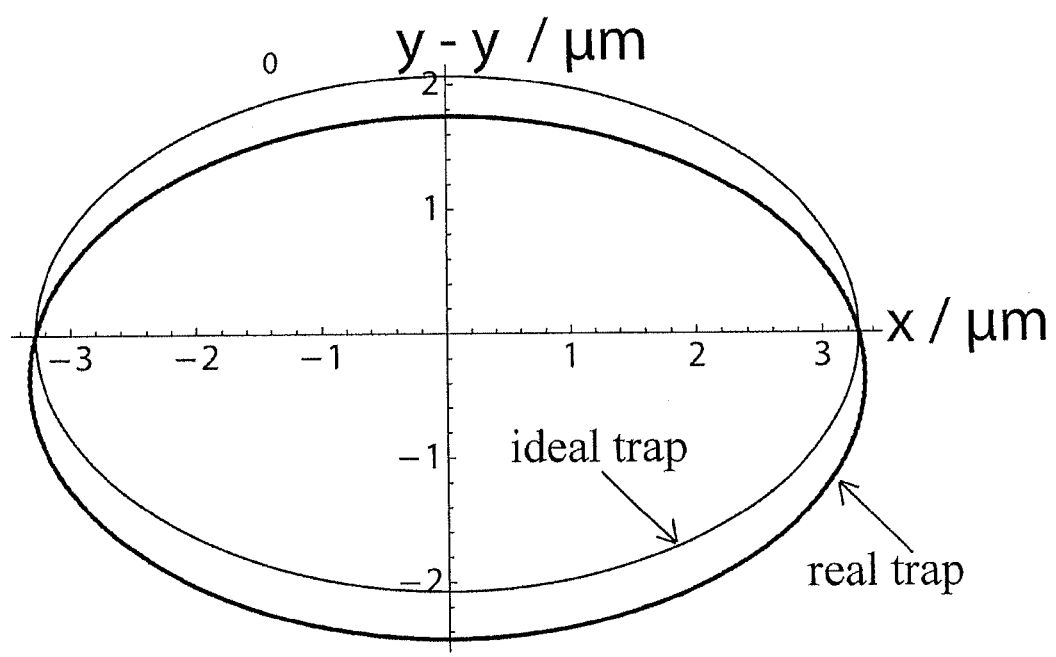
FIG. 5 is a graphical illustration of a magnetron ellipse of an ion captured in the ion trap.

The symbols $E_p$, $E_m$ represent the cyclotron and magnetron energies respectively. The orbit of the reduced cyclotron motion is only slightly affected by the ellipticity, $\xi_p \simeq \eta_p \simeq 1$. It very nearly follows the circular shape of conventional Penning traps. On the contrary, the magnetron motion becomes an ellipse, as shown in FIG. 5, where the orientation of the major and minor axes (along x or y) depends on the sign of the ellipticity parameter $\in$. Moreover, that motion is stable for $-1 < \in < 1$ and, at the limit $|\in| \to 1$ it becomes very slow, $\omega_m \to 0$. In that case, the magnetron ellipse tends towards a line, with an increasingly wide major axes and a vanishing minor one (if $\in \to +1 \Rightarrow \xi_m \to \infty$, $\eta_m \to 0$ and vice versa). For values $|\in| \geq 1$ the magnetron becomes an unbounded hyperbolic motion and trapping is not possible.

The ideal trap model is only valid for vanishing amplitudes of the particle's motion. In real experiments the electric anharmonicities must be taken into account. These generate energy-dependent fluctuations/deviations of the trapping frequencies.

All anharmonicities, even and odd, up to the $4^{th}$ order in the expansion of $\phi$, $3 \leq i+j+k \leq 4$ (see equation (5)), produce frequency shifts which scale linearly with the energies of the particle. Hence, they can be expressed in matrix form:

$$\begin{pmatrix} \Delta v_p \\ \Delta v_z \\ \Delta v_m \end{pmatrix} = \underbrace{\begin{pmatrix} M_{1,1} & M_{1,2} & M_{1,3} \\ M_{2,1} & M_{2,2} & M_{2,3} \\ M_{3,1} & M_{3,2} & M_{3,3} \end{pmatrix}}_{M=frequency-shifts\ matrix} \cdot \begin{pmatrix} \Delta E_p \\ \Delta E_z \\ \Delta E_m \end{pmatrix} \qquad (12)$$

Each perturbation to $\phi_{quad}$ appearing in equation (5) delivers such a frequency-shifts matrix. In total, the ion trap 1 requires nine $M^{ijk}$ matrices, corresponding to each $C_{ijk}$ perturbative hamiltonian. The overall frequency shifts matrix M is the sum of all of them:

$$M = M^{012} + M^{210} = M^{030} + M^{220} + M^{022} = M^{004} + M^{400} + M^{040} \qquad (13)$$

For a single electron captured in the ion trap 1, with the voltages given above the magnetic field strength B being equal to 0.5 Tesla, the overall frequency shifts matrix M is $$M = \begin{pmatrix} 5 \cdot 10^{-6} & 0.5 & -0.9 \\ 1 \cdot 10^{-3} & 203 & -411 \\ -2 \cdot 10^{-6} & -0.4 & 2 \end{pmatrix} Hz/K. \qquad (14)$$

Accurate measurement of the axial frequency $\omega_z$ is important as, in most cases, determination of the electron's eigen-frequencies or spin state depend upon it. Thus, $$M_{2,2} = \frac{\Delta v_z}{\Delta E_z}$$

is the most relevant of the frequency shifts in the frequency shifts matrix M. In the present example, it amounts to 203 Hz/K. Dependence of $v_z$ on the axial energy $E_z$, which is not constant but fluctuating, would render the detection of the electron almost impossible, even at cryogenic temperatures.

$M_{2,2}$ is given by the sum of $M_{2,2}^{004}$ and $M_{2,2}^{012}$. Taking into account that $v_m \ll v_z \ll v_p$, we have $$M_{2,2}^{004} = -\frac{q}{16\pi^4 m^2} \frac{3}{v_z} C_{004} \qquad (15)$$

$$M_{2,2}^{012} \simeq \frac{q^2}{32\pi^6 m^3} \frac{\eta_m^2}{v_z^5} C_{012}^2$$

$M_{2,2}^{012}$ is always positive, since it is proportional to the square of $C_{012}$, while $M_{2,2}^{004}$ can be positive or negative, depending on the sign of $C_{004}$. Hence, if an appropriate optimal tuning ratio $T_c^{opt}$ can be found, such that the latter matrix element cancels the former $T_c^{opt} \Leftrightarrow M_{2,2}^{012} + M_{2,2}^{004} = 0$, then the linear dependence of $v_z$ upon the axial energy $E_z$ can be eliminated.

Figure 6:
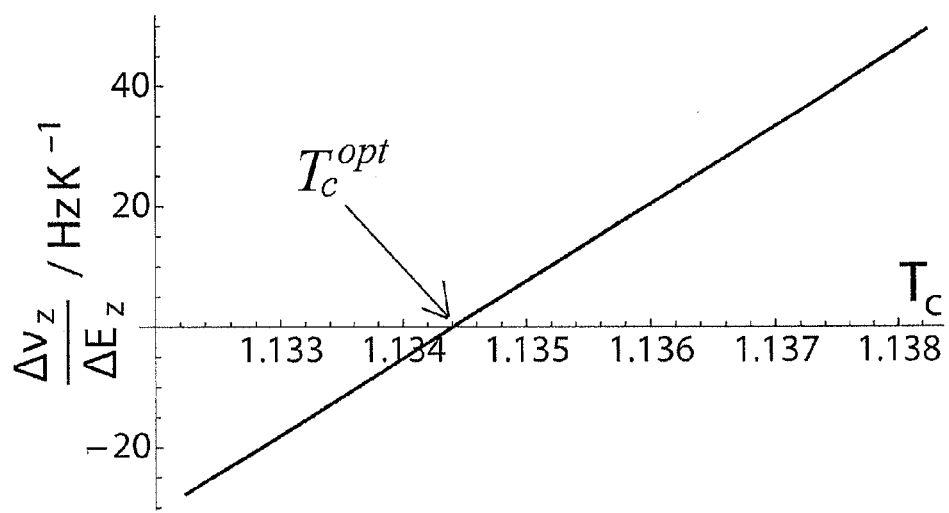
FIG. 6 is a graphical illustration of an optimal tuning ratio for the ion trap.

The existence of the optimal tuning ratio $T_c^{opt}$ cannot be universally guaranteed, however it turns out that this is often the case. For the ion trap 1 described herein, it can be seen in FIG. 6, where $$\frac{\Delta v_z}{\Delta E_z}$$

is plotted as a function of the applied tuning ratio $T_c$. One value, $T_c^{opt} = 1.13440$ eliminates $M_{2,2}$.

Since $v_z \propto C_{002}^{1/2}$, both frequency shifts in equation (15) equally scale with $V_r^{-1/2}$. The equation $M_{2,2}(T_c^{opt}) = 0$ is independent of the actual value of the voltage $V_r$ applied to the ring electrode 6 and is solely defined by the voltage ratios $T_c$ and $T_e$. A similar argument applies to the mass m and charge q of the particle. Thus, the optimal tuning ratio $T_c^{opt}$ is a well defined quantity, independent of the voltage $V_r$ applied to the ring electrode 6 and of the mass m and charge q of the trapped particle. It does change with the tuning ratio $T_e$, but this is simply equivalent to an inevitable dependence upon the trapping height $y_0$. The appearance of $\eta_m$ in $M_{2,2}^{012}$ also implies that the optimal tuning ratio $T_c^{opt}$ theoretically varies with the strength of magnetic field B. However, that dependence is negligible, being approximately equal to $-2 \cdot 10^{-6}$ Tesla$^{-1}$ in the present example.

$M_{2,2}^{012}$ results from the slight dependence of the trapping height $y_0$ on the axial energy $E_z$, i.e. $y_0 = y_0(E_z)$. Indeed, for vanishing axial energy ($E_z = 0$), $y_0$ is the solution to the implicit equation $C_{010}(y_0) = 0$. For $E_z > 0$, that equation must be modified into $C_{010}(y_0') + \langle z^2 \rangle \cdot C_{012}(y_0') = 0$. Here, $\langle z^2 \rangle$ represents the time average of $A_z^2 \cos^2(\omega_z t)$. Thus, the real trapping height, $y_0' = y_0 + \Delta y$, depends on the axial amplitude, hence, on $E_z \Delta y$, and can be estimated as follows, assuming the approximation $C_{012}(y_0') \cong C_{012}(y_0)$:

$$\{C_{010}(y_0') + \langle z^2 \rangle C_{012}(y_0')\} - C_{010}(y_0) = \qquad (16)$$

$$0 \to \underbrace{\frac{C_{010}(y_0 + \Delta y) - C_{010}(y_0)}{\Delta y}}_{=2C_{020}} \Delta y + \langle z^2 \rangle C_{012}(y_0) = 0 \Rightarrow \Delta y =$$

$$-\frac{1}{2} \frac{C_{012}}{C_{020}} \langle z^2 \rangle = \left( A_z^2 \langle \cos^2(\omega_z t) \rangle = \frac{E_z}{m\omega_z^2} \right) = -\frac{1}{8\pi^2 m v_z^2} \cdot \frac{C_{012}}{C_{020}} E_z$$

At $y_0 + \Delta y$, the axial potential is modified with respect to $y_0$. In particular, the $E_z = 0$ axial curvature, $C_{002}(y_0)$, changes to $C_{002}'(y_0')$. This subsequently forces the variation of the axial frequency $\omega_z$ as a function of the axial energy $E_z$ $$\Delta \omega_z = \qquad (17)$$

$$\frac{\partial \omega_z}{\partial y} \cdot \Delta y = \frac{q}{m} \frac{1}{\sqrt{\frac{2qC_{002}}{m}}} \frac{\partial C_{002}}{\partial y} \Delta y \Rightarrow \frac{\Delta v_z}{\Delta E_z} = -\frac{q^2 C_{012}^2}{32\pi^6 m^3 v_z^5} \left( \frac{C_{002}}{2C_{020}} \right)$$

The model can be tested by computing numerically the radial motion of an electron in the ion trap 1, using $\phi(x, y, z)$ of equation 1 without approximations. The numerical calculation shows a vertical shift of the radial ellipse relative to the ideal one, as shown in FIG. 5. This is computed assuming $E_z = 4.2$ K, $E_m = -E_z(v_m/v_z)$ and $E_p \sim 0$. The shift predicted by equation (16) amounts to $\Delta y = -0.355$ μm and is in good agreement with the numerical result of $\Delta y = -0.325$ μm. For low ellipticity, $$\varepsilon \to 0 \Rightarrow \eta_m^2 \to 1 \text{ and } \frac{C_{002}}{2C_{020}} \to -1$$

(see equation (6)). In this case, equations (15) and (17) become identical. The former is actually accurate only for moderate values of the ellipticity parameter $\in$, below approximately 0.5. Otherwise, it delivers shifts increasingly bigger than those predicted by the rigorous equation 15. In the limit $\in \to +1 \Rightarrow \eta_m \to 0$ and, as predicted by that equation, the effect of $C_{012}$ upon $v_z$ is theoretically cancelled.

Figure 7:
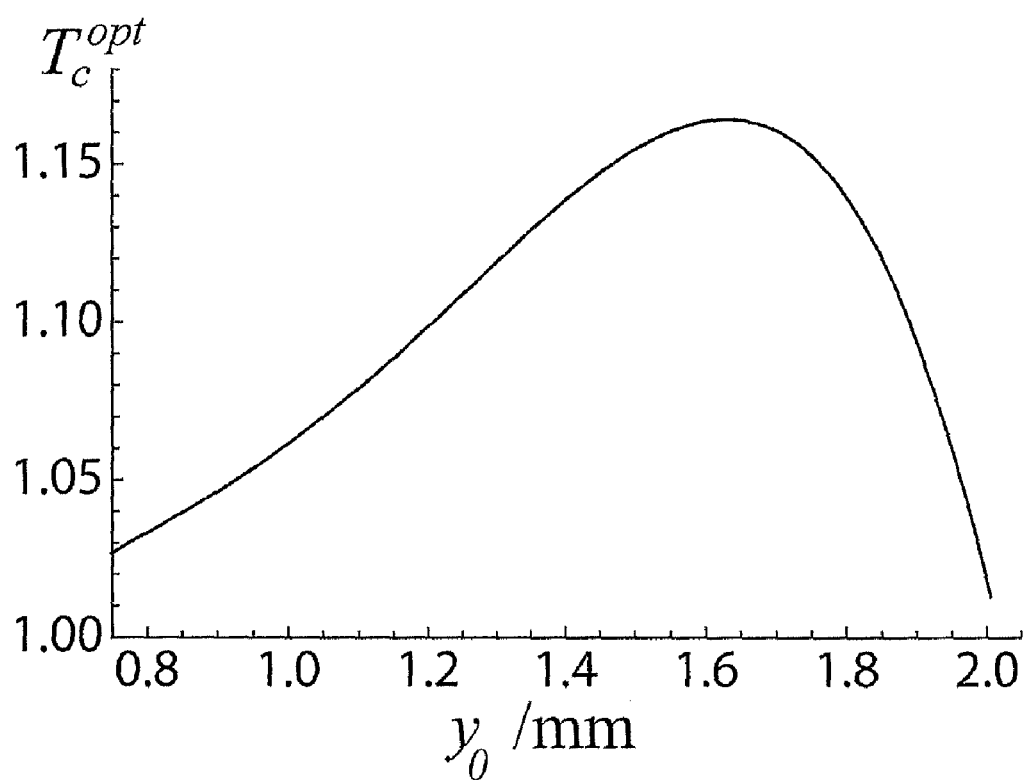
FIG. 7 is a graphical illustration of an optimal tuning ratio of the ion trap as a function of a trapping height $y_0$.

An optimal tuning ratio $T_c^{opt}$ can be found within a continuous interval of trapping heights $y_0$, however it varies smoothly as a function of trapping height $y_0$. This is shown in FIG. 7, where the plot of optimal tuning ratio $T_c^{opt}$ versus trapping height $y_0$ is presented. A useful interval exists 0.8 mm $\leq y_0 \leq$ 2 mm, where $M_{2,2}$ can be eliminated. Beyond the upper and lower bounds of that limit, the optimal tuning ratio $T_c^{opt}$ does not exist.

Figure 8:
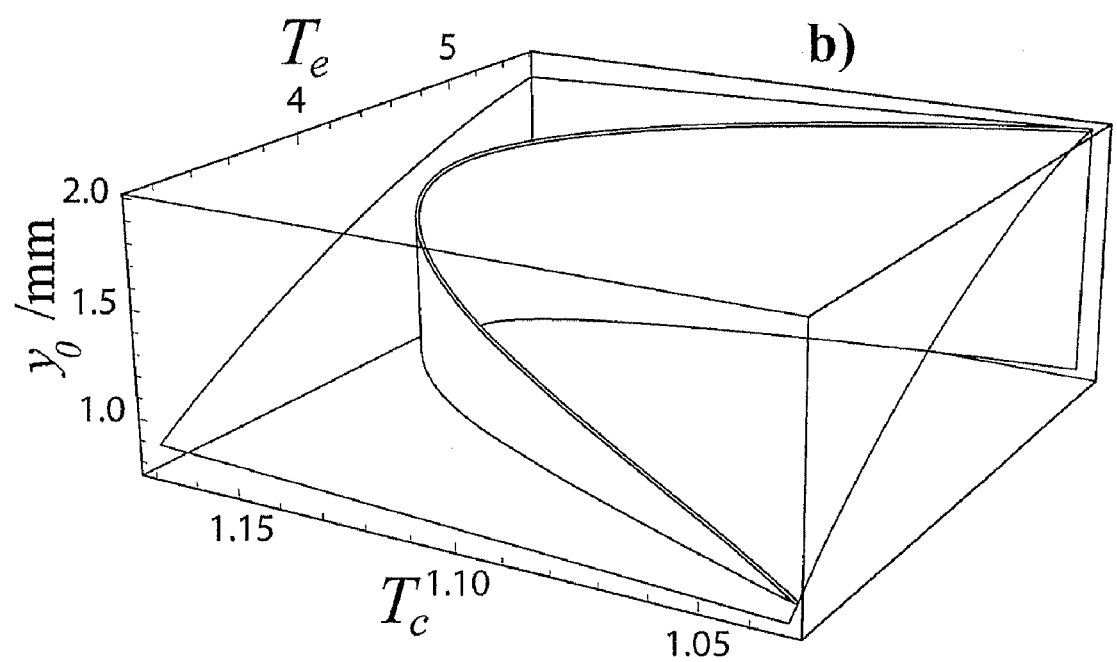
FIG. 8 is a graphical illustration of variation of the trapping height $y_0$ as a function of voltage ratios $T_c$, $T_e$.

As shown in FIG. 8, the tuning ratios $T_c$ and $T_e$ can be tuned independently and multiple combinations can be found to obtain one particular trapping height $y_0$. However, the compensated interval is determined by a univocal relationship, $y_0 \Leftrightarrow (T_e, T_c^{opt})$, as featured in that FIG. 8. It must be noted also that the end cap to ring tuning ratio $T_e$ is the main parameter for changing $y_0$, while $1.2 \geq T_c \geq 1$, and the compensation tuning ratio $T_c$ is basically used for compensation.

Figure 9:
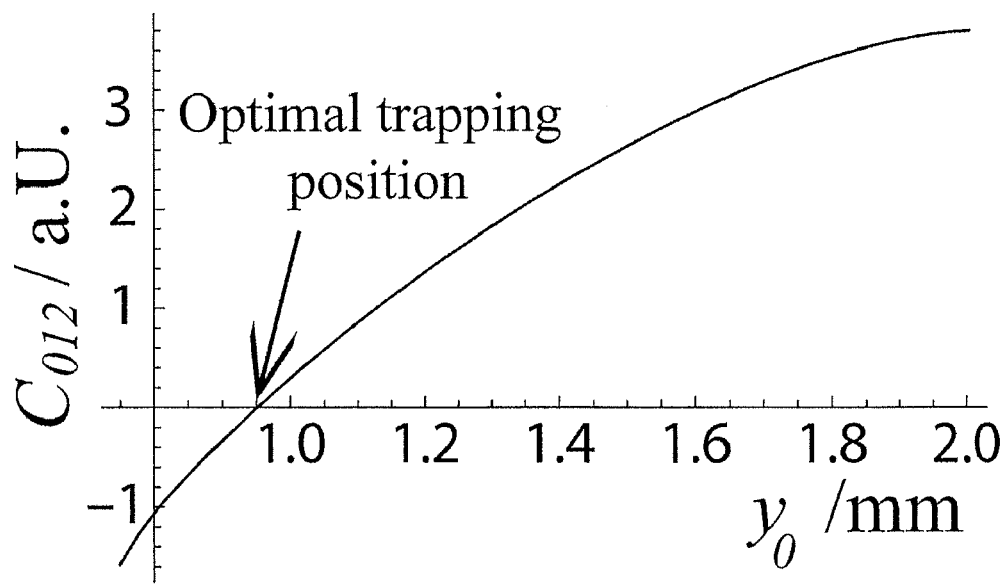
FIG. 9 is a graphical illustration of anharmonicity $C_{012}$ along a compensated path of the ion trap.

FIG. 9 shows the variation of $C_{012}$ with the trapping height $y_0$. It can be seen that at $y_0$ approximately equal to 0.95 mm, $C_{012}$ vanishes. In this case, the compensation $$\frac{\Delta v_z}{\Delta E_z}$$

of also implies that $C_{004}$ will disappear. Hence, within the compensated interval, an optimal trapping position can be found, $y_0^{012}$, for which $C_{012} = C_{004} = 0$.

For a circular Penning trap, the symmetry of x and y implies that $C_{202} = C_{022}$. Thus if $C_{004} = 0$, the constraints of equation (7) force all other octupole terms, $C_{202}$, $C_{022}$, $C_{400}$, $C_{040}$ and $C_{220}$, to vanish simultaneously. For an elliptical Penning trap though, x and y are not indistinguishable. If $C_{004} = 0$, that only implies that $C_{202} = -C_{022}$, but in general they will not disappear. The same argument applies to the case $C_{012} = 0$ and the coefficients $C_{210}$ and $C_{030}$. For these reasons, even when $C_{004} = C_{012} = 0$, the overall frequency shifts matrix M will always contain some non-zero elements. An ideal elliptical trap cannot be exactly approximated with the ion trap 1 described herein. The non-vanishing elements are basically the shifts produced by $E_p$ (first column of frequency shifts matrix M) and those due to $E_m$ (third column).

It can be shown that for all trapping heights $y_0$ within the compensated interval, the frequency shifts produced by the cyclotron and magnetron energies are of the same order of magnitude as in the example of equation (14). Thus, if $E_p$ is in the cryogenic domain ($E_p$ approximately equal to 4.2 K), the corresponding deviations of $v_p$ and $v_m$ are in the range of a few $\mu$Hz, and of a few mHz for $v_z$. The resulting relative uncertainties in any of the frequencies are negligible. Increasing the strength of the magnetic field B would make those shifts even smaller. Therefore, the first column of frequency shifts matrix M can always be ignored.

The numbers in the third column of equation (14) are apparently more significant. However, applying sideband cooling, the magnetron energy takes the value $E_m = -E(v_m/v_z)$, which is in the range of a few mK, (if $E_z$ is approximately equal to 4.2 K). Since the magnetron energy does not fluctuate in time, the resulting frequency shifts represent mere offsets, which can be corrected for without affecting the "visibility" of the trapped particle. In the example, the biggest relative offset would be approximately $10^{-7}$ for $v_z$, propagating to approximately $10^{-12}$ for $v_c$. Increasing the strength of magnetic field B, or the voltage $V_r$ applied to the ring electrode 6, reduces further the third column of frequency shifts matrix M.

After eliminating the linear dependence of the axial frequency $\omega_z$ upon the axial energy $E_z$, non-linear shifts might still be important, specially when trapping height $y_0$ is small. The next most significant even anharmonicities, whose effect can be calculated by first order perturbation theory, are $C_{006}$ and $C_{008}$. These produce the following quadratic and cubic shifts, respectively:

$$\Delta v_z = \frac{15q}{128\pi^6 m^3} \frac{C_{006}}{v_z^5} \cdot (\Delta E_z)^2 \qquad (18)$$

$$\Delta v_z = \frac{140q}{2048\pi^8 m^4} \frac{C_{008}}{v_z^7} \cdot (\Delta E_z)^3$$

The next most significant odd anharmonicities, after those included in equation (5), are $C_{014}$, $C_{212}$, $C_{032}$, $C_{410}$, $C_{230}$ and $C_{050}$ ($\Leftrightarrow$ i+j+k=5). The calculation of the corresponding frequency shifts, with rigorous second order perturbation theory, would be extremely cumbersome. Instead, following the derivation of equations (16) and (17), we obtain $$\Delta v_z = -\frac{3q}{128\pi^6 m^3 v_z^5} \frac{C_{012} \cdot C_{014}}{C_{020}} \cdot (\Delta E_z)^2 \qquad (19)$$

$$\Delta v_z = -\frac{q}{128\pi^6 m^3 v_z^5} \frac{C_{012} \cdot C_{212}}{C_{020}} \cdot \Delta E_z \left( \frac{\xi_p^2}{\gamma_p v_p^2} \Delta E_p + \frac{\xi_m^2}{v_m^2 - v_z^2/2} \Delta E_m \right) \qquad (20)$$

Figure 10:
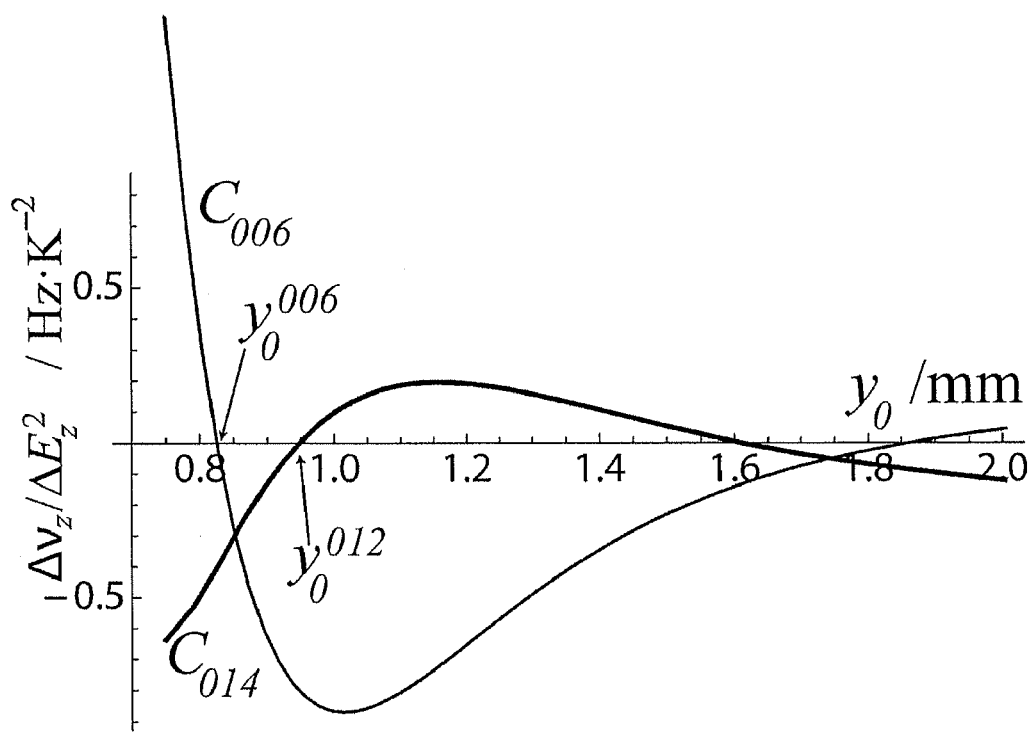
FIG. 10 is a graphical illustration of quadratic axial frequency shifts produced by anharmonicities $C_{006}$, $C_{014}$.
Figure 11:
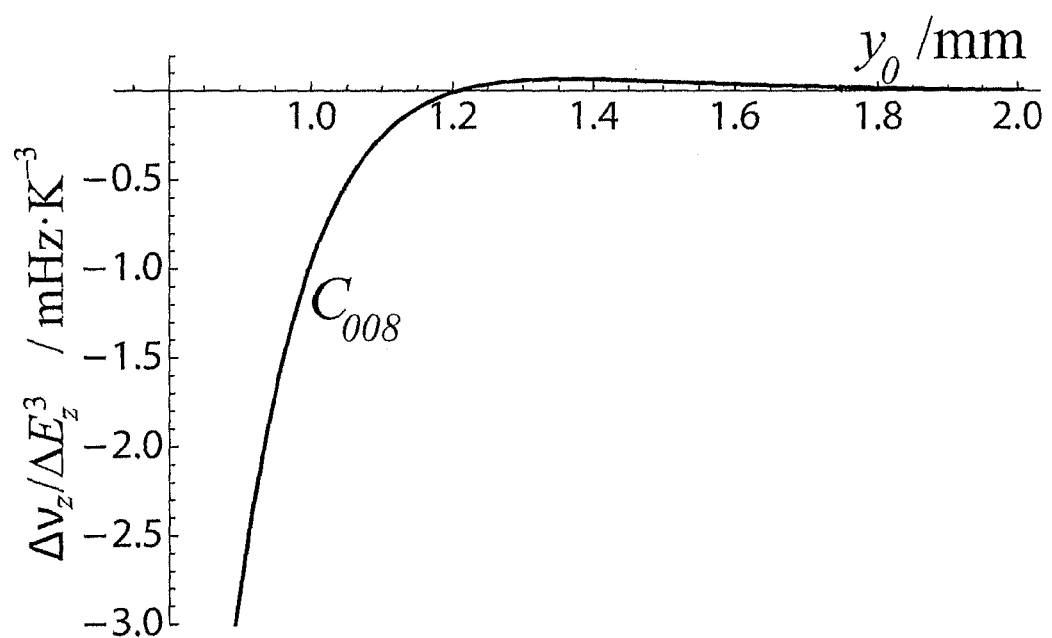
FIG. 11 is a graphical illustration of a shift produced by a vertical anharmonicity $C_{008}$.

Referring to FIGS. 10 and 11, the shift predicted by equation (19) has a similar magnitude as the one produced by $C_{006}$. This can be taken into account when designing the ion trap 1. It is noteworthy that equations (19) and (20) vanish at optimal trapping height $y_0^{012}$.

Equation (20) predicts a frequency shift scaling with the products $\Delta E_z \cdot \Delta E_p$ and $\Delta E_z \cdot \Delta E_m$. In the former case, the shift is proportional to $1/v_p^2$. Hence, it is normally negligible. In the latter case, $\Delta E_m$ is very small and the corresponding value of $\Delta v_z$ is also inappreciable. Thus, $C_{212}$ can be ignored. The same arguments apply to $C_{032}$, which produces a shift very similar to equation 20 ($\xi_{p,m}$ must be simply substituted by $\eta_{p,m}$). The remaining fifth order coefficients, $C_{410}$, $C_{230}$ and $C_{050}$, generate only deviations of $v_p$ and $v_m$ with products of $\Delta E_p$ and $\Delta E_m$. Therefore, they can be ignored too. Finally, similar arguments apply to all sixth order coefficients which have not been considered so far, namely $C_{222}$, $C_{204}$, $C_{024}$, $C_{420}$, $C_{402}$, $C_{042}$, $C_{240}$, $C_{600}$ and $C_{060}$. They are all irrelevant.

Figure 12:
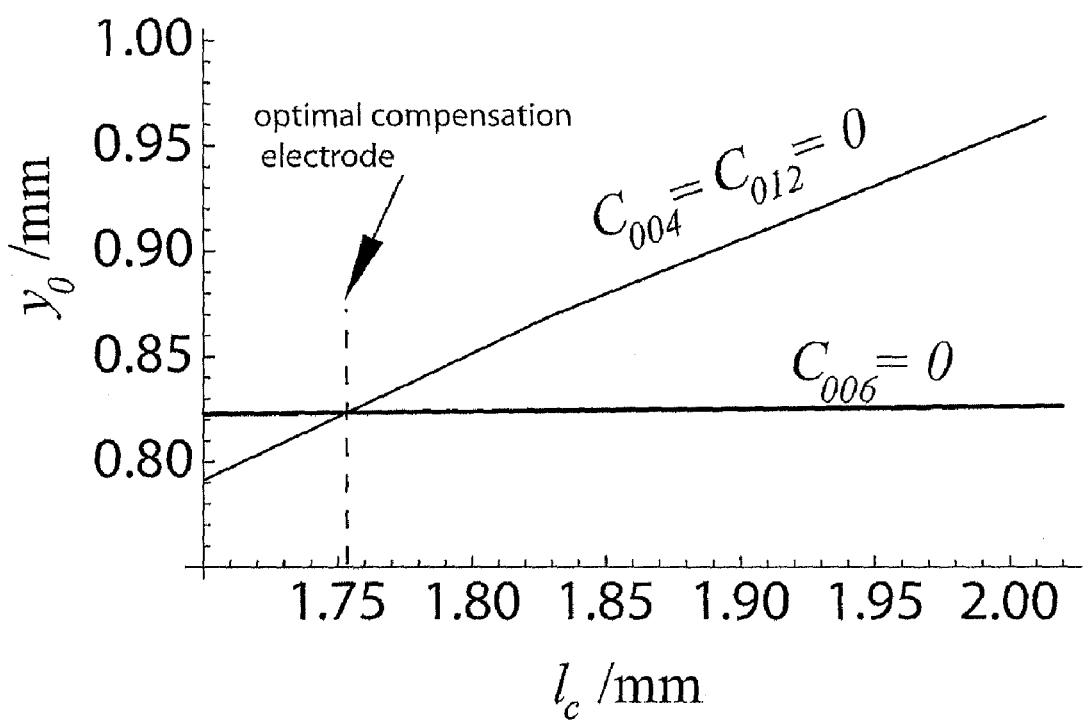
FIG. 12 is a graphical illustration of optimal trapping positions $y_0^{012}$ and $y_0^{016}$ as a function of a length $l_c$ of compensation electrodes of the ion trap.
Figure 13:
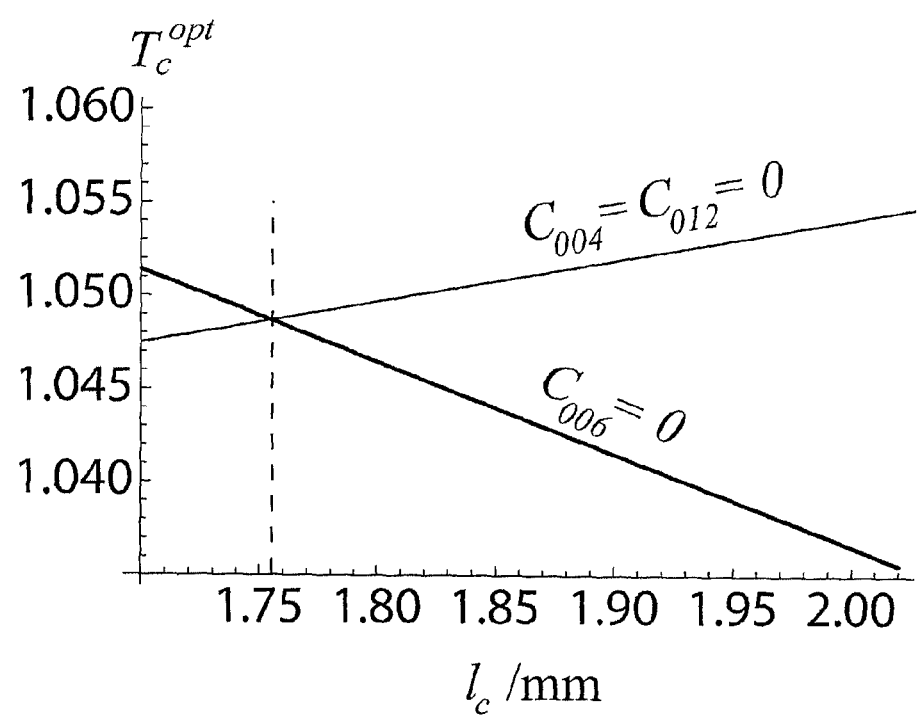
FIG. 13 is a graphical illustration of an optimal tuning ratio of the ion trap as a function of the length $l_c$ of compensation electrodes.

FIG. 10 reveals the existence of one particular optimal trapping height, $y_0^{006}$, approximately equal to 0.83 mm, at which $C_{006} = 0$. The question which arises is whether the ion trap 1 can be designed to make $y_0^{006}$ and $y_0^{012}$ coincident. The answer is affirmative and is illustrated in FIGS. 12 and 13. FIG. 12 It shows the variation of $y_0^{012}$ and $y_0^{006}$ when changing the length $l_c$ of the compensation electrodes 7,8 while keeping all other dimensions of the ion trap 1 constant. For the example, when the length $l_c$ of the compensation electrodes 7,8 is approximately equal to 1.75 mm, the optimal trapping heights $y_0^{012} = y_0^{006} \cong 0.82$ mm. In this example, $C_{004} = C_{012} = C_{006} = 0$, at $y_0^{012}$, as shown in FIG. 13.

Figure 14:
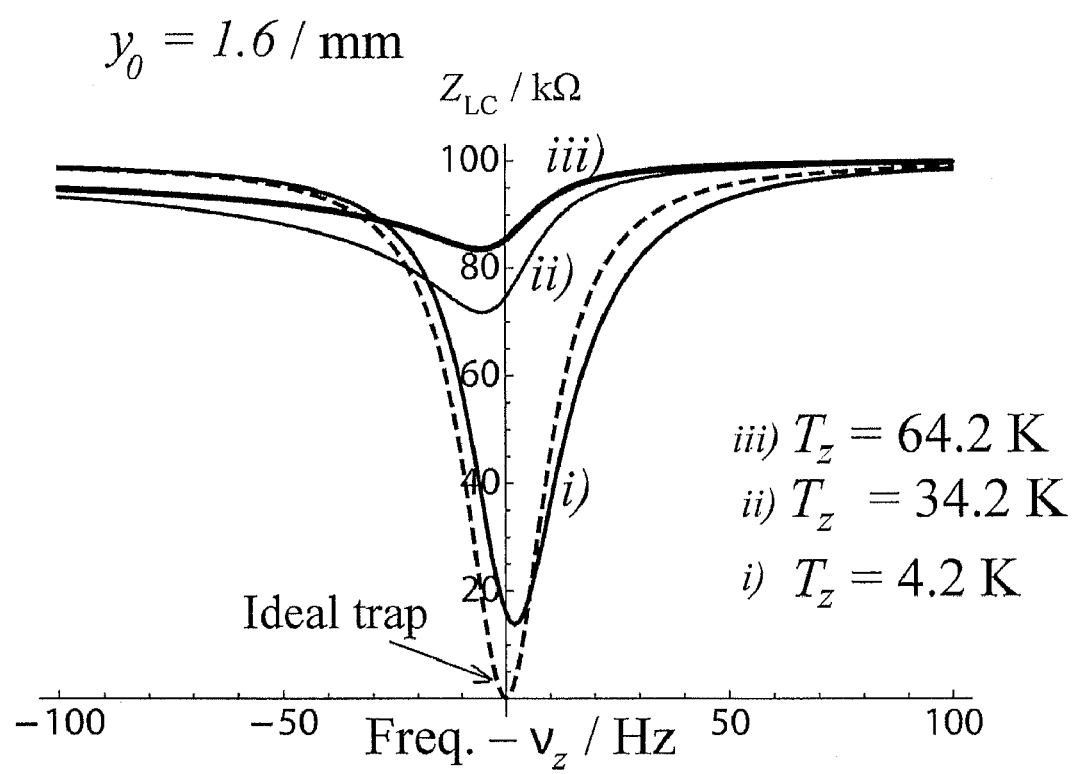
FIG. 14 is a graphical illustration of axial dip of a single electron trapped in the ion trap for three different temperatures of the electron.
Figure 15:
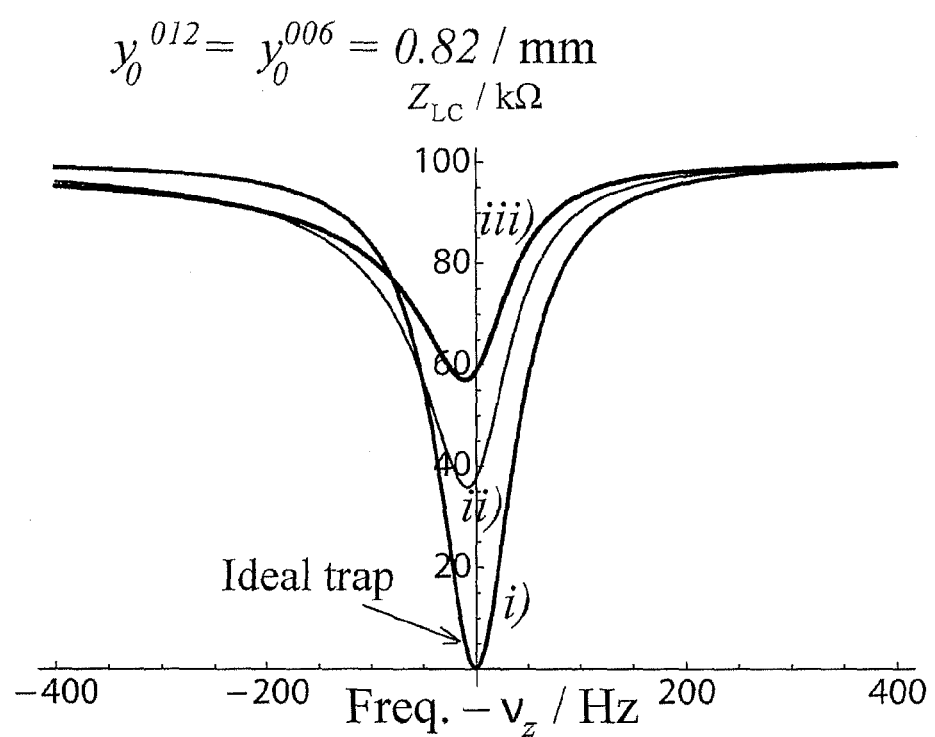
FIG. 15 is another graphical illustration of axial dip of a single electron trapped in the ion trap for three different temperatures of the electron.

With the dependence $v_z = v_z(E_z, E_z^2, E_z^3)$ given in equations (15), (18) and (19), a realistic simulation of the axial signal of a trapped electron can be performed. The simulations are shown in FIGS. 14 and 15. The curves are obtained by averaging the axial dip (with $v_z = v_z(E_z, E_z^2, E_z^3)$ over a Boltzmann distribution of the axial energy E. Three different values of the axial temperature $T_z$ are analyzed.

FIGS. 14 and 15 show the reduction of the "visibility" of the dips with increasing axial temperature. A random position, $y_0=1.6$ mm (but with optimized tuning ratio), has been chosen for FIG. 14. In this case, $C_{006}$ and $C_{014}$ produce the increasing deterioration of the dip, while $C_{008}$ is negligible. In FIG. 15, $y_0=y_0^{012}=y_0^{006}=0.82$ mm. Now, $C_{004}=C_{012}=C_{006}=0$. However, $C_{008}$ still diminishes the quality of the signal with $T_z$. It can be concluded, that the detection of a single electron at 4.2 K (or lower) should be always possible within the compensated interval. However, for increasing temperatures, the non-linear anharmonicities make its observation significantly more difficult, even for relatively modest values of $T_z$.

So, it can be appreciated that there exists a trapping interval where the linear dependence of the axial frequency upon the axial energy can be eliminated by appropriately tuning the voltage of the compensation electrodes; and a particular position within the compensated interval, $y_0^{012}$, where the main anharmonicities, $C_{012}$ and $C_{004}$, simultaneously vanish. Moreover, optimization of the compensation electrodes 7, 8 permits the further elimination of $C_{006}$ at the optimal trapping position. These properties exist for a wide range of possible dimensions and aspect ratios of the electrode array 3.

Considering now the magnetic field generator 2, the primary magnetic element 14 is a conducting wire of rectangular cross section placed underneath the electrode array 3. The primary magnetic element 14 and shim magnetic elements 15, 16, 17, 18 are arranged to conduct electrical current in a direction perpendicular to the length of the row 5 of electrodes 6, 7, 8, 9, 10 and parallel with the plane of the electrode array 3. Typically, the magnetic elements 14, 15, 16, 17, 18 extend perpendicular to the length of the row 5 of electrodes 6, 7, 8, 9, 10 for a distance greater than the width $S_0$ of the electrodes 6, 7, 8, 9, 10 in the row 5, and to both side of the row 5. The primary magnetic element 14 also has a width $l_p$ in a direction along the length of the row 5 of electrodes 6, 7, 8, 9, 10 that is greater than the length $l_r$ of the ring electrode 6, and typically $l_p$ is at least twice $l_r$.

The magnetic elements 14, 15, 16, 17, 18 are arranged such that the current flows only in the direction x perpendicular to the length of the row 5 of electrodes 6, 7, 8, 9, 10. Substantially no current flows in the magnetic elements 14, 15, 16, 17, 18 in the directions y and z perpendicular to the length of the row 5 of electrodes 6, 7, 8, 9, 10. This can only be achieved perfectly if the magnetic elements 14, 15, 16, 17, 18 are infinitely long. However, as real magnetic elements 14, 15, 16, 17, 18 are not infinitely long and have to be coupled so as to form a circuit, a magnetic shield (not shown) can be provided between the magnetic elements 14, 15, 16, 17, 18 and wires (not shown) that complete the electric circuit that provides electric current to the magnetic elements 14, 15, 16, 17, 18.

Considering the magnetic elements 14, 15, 16, 17, 18 as infinite straight wires in the direction x for simplicity, we can make a series expansion based on Maxwell's equations of the magnetic vector potential around the trapping position $(0, y_0, 0)$:

$$A(y, z) = \quad (21)$$

$$A(y_0) + \frac{\partial A}{\partial y}(y-y_0) + \frac{\partial A}{\partial z}z + \frac{1}{2!}\cdot\frac{\partial^2 A}{\partial y^2}(y-y_0)^2 + \frac{1}{2!}\cdot\frac{\partial^2 A}{\partial z^2}z^2 +$$

$$\frac{1}{1!\cdot 1!}\cdot\frac{\partial^2 A}{\partial y \partial z}z(y-y_0) + \frac{1}{2!\cdot 1!}\cdot\frac{\partial^3 A}{\partial y^2 \partial z}z(y-y_0)^2 +$$

-continued $$\frac{1}{1!\cdot 2!}\cdot\frac{\partial^3 A}{\partial y \partial z^2}z^2(y-y_0) + \frac{1}{3!}\cdot\frac{\partial^3 A}{\partial y^3}(y-y_0)^3 + \frac{1}{4!}\cdot\frac{\partial^4 A}{\partial z^4}z^4 +$$

$$\frac{1}{4!}\cdot\frac{\partial^4 A}{\partial y^4}(y-y_0)^4 + \frac{1}{2!\cdot 2!}\cdot\frac{\partial^4 A}{\partial y^2 \partial z^2}z^2(y-y_0) + \ldots$$

This can yield the following magnetic vector potential terms $$\vec{A}_0 = -B_z^0(y-y_0)\hat{u}_x$$

$$\vec{A}_1 = \frac{1}{2!}\frac{\partial B_z}{\partial y}(z^2-(y-y_0)^2)\hat{u}_x$$

$$\vec{A}_2 = \frac{1}{3!}\frac{\partial^2 B_z}{\partial y^2}(y-y_0)(3z^2-(y-y_0)^2)\hat{u}_x$$

$$\vec{A}_3 = \frac{1}{4!}\frac{\partial^3 B_z}{\partial y^3}(6z^2(y-y_0)^2 - z^4 - (y-y_0)^4)\hat{u}_x$$

$$\vec{A}_4 = \frac{1}{5!}\frac{\partial^4 B_z}{\partial y^4}(y-y_0)(10z^2(y-y_0)^2 - (y-y_0)^4 - 5z^4)\hat{u}_x$$

It can be appreciated that all magnetic inhomogeneities are caused by the drop of the magnetic field, $B_z$, with the vertical distance y. If the derivatives of $B_z$ with y are eliminated, then the only term of the magnetic vector remaining is $\vec{A}_0$. In this case the magnetic field will be homogeneous. Accordingly, the shim magnetic elements 15, 16, 17, 18 are positioned to achieve this.

The primary magnetic element 14 generates a main magnetic field, which is everywhere inhomogeneous, due to the drop of its strength normal to the plane of the electrode array 3 (direction y). The pair of shim magnetic elements 15, 16 adjacent the primary magnetic element 14 generate a first compensating magnetic field. This has a gradient and a curvature. It can be shown that the gradient and curvature are controlled basically by the current $I_1$ flowing along the shim magnetic elements 15, 16. The current $I_1$ can be chosen to compensate for the first order magnetic vector $\vec{A}_1$ of the magnetic field generated by the primary magnetic element 14 (at the trapping height $y_0$). Hence, the overall gradient of the magnetic field is compensated towards zero. However, the compensating magnetic field generated by the pair of shim magnetic elements 15, 16 adjacent the primary magnetic element 14 does not compensate for the second order magnetic vector $\vec{A}_2$ of the magnetic field generated by the primary magnetic element 14. This can be compensated for by the shim magnetic elements 17, 18 at the ends of the row 13 of magnetic elements. More specifically, a current $I_2$ flowing in the shim magnetic elements 17, 18 at the ends of the row 13 of magnetic elements can be chosen to compensate for the second order magnetic vector $\vec{A}_2$ of the magnetic field generated by the primary magnetic element 14 (at the trapping height $y_0$). In other embodiments, further shim magnetic elements are provided to compensate for higher order components of the magnetic field, thereby improving the inhomogeneity of the magnetic field.

In the illustrated embodiment, the magnetic elements 14, 15, 16, 17, 18 are coplanar, but this is not strictly required. The shim magnetic elements 15, 16, 17, 18 can be positioned above the primary magnetic element 14. Usually the cross section of the shim magnetic elements 15, 16, 17, 18 is smaller than that of the primary magnetic element 14.

Figure 16:
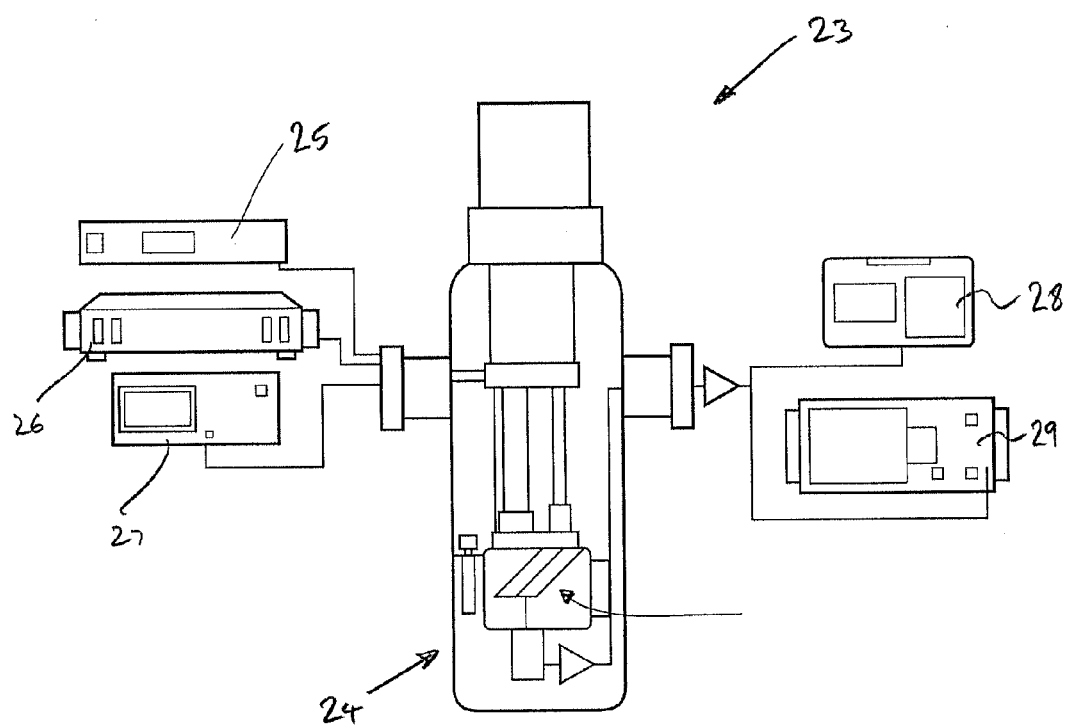
FIG. 16 is a schematic illustration of a mass spectrometer incorporating the ion trap.

Referring to FIG. 16, a mass spectrometer 23 according to a preferred embodiment of the disclosure comprises the ion trap 1 located in a cryogenic vacuum chamber 24 capable of cooling the ion trap to a temperature of 4.2 K or lower. A DC voltage source 25 is provided to supply the voltages $V_r, V_c, V_e$ to the ring electrode 6, compensation electrodes 7, 8 and end cap electrodes 9, 10. A microwave generator 26 and function generator 27 are provided for injecting microwaves into the ion trap for probing the trapped particles, and an oscilloscope 28 and Fourier transform analyser are provided for analysing microwaves exiting the ion trap 1. Multiple ion traps 1 can be provided in the cryogenic vacuum chamber 24, allowing the mass spectrometer 23 to analyse multiple trapped particles at the same time, under similar ambient conditions.

Figure 17:
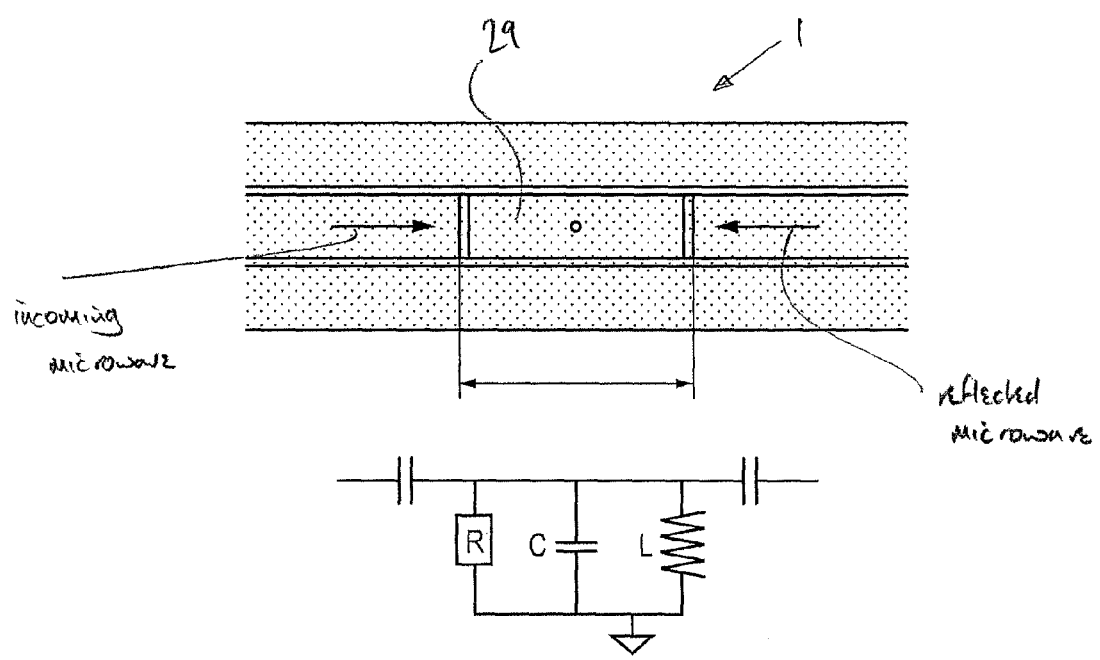
FIG. 17 is a schematic illustration of a waveguide incorporating the ion trap.
Figure 18:
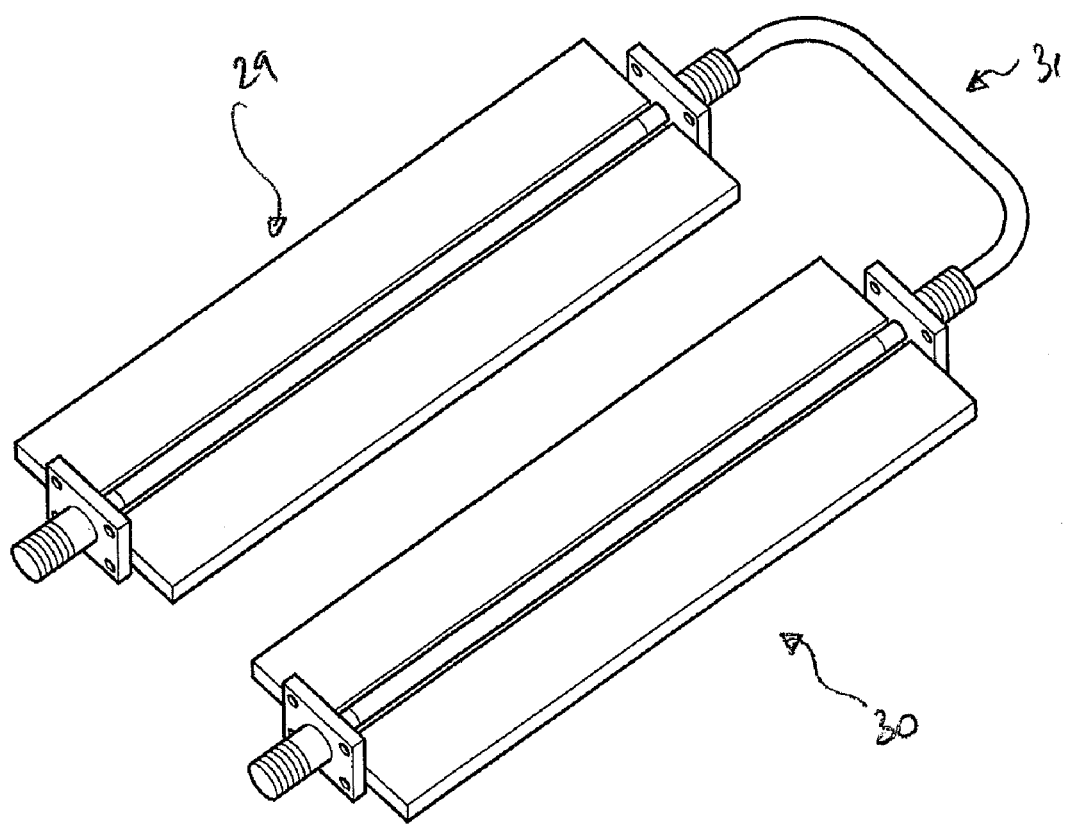
FIG. 18 is a schematic illustration of the waveguide coupled to an external superconducting microwave cavity.

Referring to FIGS. 17 and 18, the ion trap 1 can provide a cavity 29 for microwaves. The cavity is equivalent to an LC circuit, as shown in FIG. 17, and can be coupled to a distance microwave cavity 30 via an external microwave transmission line to form a quantum electrodynamic circuit.

Other variations and modifications will be apparent to the skilled person. Such variations and modifications may involve equivalent and other features which are already known and which may be used instead of, or in addition to, features described herein. Features that are described in the context of separate embodiments may be provided in combination in a single embodiment. Conversely, features which are described in the context of a single embodiment may also be provided separately or in any suitable sub-combination.

It should be noted that the term "comprising" does not exclude other elements or steps, the term "a" or "an" does not exclude a plurality, a single feature may fulfil the functions of several features recited in the claims and reference signs in the claims shall not be construed as limiting the scope of the claims. It should also be noted that the Figures are not necessarily to scale; emphasis instead generally being placed upon illustrating the principles of the present invention.

The invention claimed is:

1. An ion trap comprising:
   a magnetic field generator arranged to generate a magnetic field; and
   an array of electrodes arranged to generate an electrostatic field including a turning point in electrical potential at a location where the magnetic field is substantially homogeneous,
   wherein the array of electrodes is planar and parallel to the direction of the magnetic field at the location.

2. The ion trap of claim 1, wherein the electrodes of the array each have surfaces facing the location where the magnetic field is substantially homogeneous, which surfaces are substantially coplanar.

3. The ion trap of claim 1, wherein the array of electrodes comprises a row of three or more electrodes, which row is arranged to be parallel to the direction of the magnetic field at the location where the magnetic field is substantially homogeneous.

4. The ion trap of claim 3, wherein the row comprises five electrodes.

5. The ion trap of claim 3, wherein the lengths of the electrodes along the direction of the row are such that an electrode in the middle of the row is shortest and electrodes at the ends of the row are longest.

6. The ion trap of claim 3, comprising a guard electrode on each side of the row.

7. The ion trap of claim 6, wherein the guard electrodes overlap the electrodes of the row.

8. The ion trap of claim 1, wherein the array of electrodes is provided on a substrate and the magnetic field generator is provided on the same substrate.

9. The ion trap of claim 8, wherein the magnetic field generator comprises a row of magnetic elements, which row extends in the same direction as the row of electrodes.

10. The ion trap of claim 9, wherein the magnetic elements each comprise a wire arranged to conduct an electric current.

11. The ion trap of claim 9, wherein a primary magnetic element is arranged to generate a first component of the magnetic field and the other magnetic elements are arranged to generate compensating components of the magnetic field that reduce the gradient and curvature of the first component of the magnetic field at the location where the magnetic field is substantially homogeneous.

12. The ion trap of claim 8, wherein the array of electrodes is provided on a top surface of the substrate and the magnetic field generator is provided below the array of electrodes.

13. A mass spectrometer comprising the ion trap of claim 1.

14. A quantum electrodynamic circuit comprising the ion trap of claim 1.

15. A method of trapping an ion, the method comprising:
    using a magnetic field generator to generate a magnetic field; and
    using an array of electrodes to generate an electrostatic field including a turning point in electrical potential at a location where the magnetic field is substantially homogeneous,
    wherein the array of electrodes is planar and parallel to the direction of the magnetic field at the location.

* * * * *